(12) United States Patent
Ersoy et al.

(10) Patent No.: US 6,402,262 B1
(45) Date of Patent: Jun. 11, 2002

(54) ACTUATING DEVICE FOR THE BRAKING SYSTEM OF A MOTOR VEHICLE

(75) Inventors: Metin Ersoy, Walluf; Waldemar Rogowski, Osnabrück; Dieter Gröger, Damme, all of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,641

(22) PCT Filed: May 2, 2000

(86) PCT No.: PCT/DE00/01338

§ 371 (c)(1),
(2), (4) Date: Jan. 10, 2001

(87) PCT Pub. No.: WO00/68055

PCT Pub. Date: Nov. 16, 2000

(30) Foreign Application Priority Data

May 10, 1999 (DE) .......................................... 199 21 392

(51) Int. Cl.⁷ ................................................. B60T 8/44
(52) U.S. Cl. .................. 303/114.3; 91/376 R; 60/547.1
(58) Field of Search .......................... 303/114.1, 114.3, 303/3; 188/355, 356, 357; 91/376 R, 369.1, 369.2; 60/547.1, 533, 581, 585

(56) References Cited

U.S. PATENT DOCUMENTS

| | | | | |
|---|---|---|---|---|
| 4,256,016 A | * | 3/1981 | Thomas ...................... | 91/369 A |
| 4,856,416 A | * | 8/1989 | Nix et al. .................. | 91/169.1 |
| 4,884,403 A | * | 12/1989 | Weber ........................ | 60/547.1 |
| 5,331,813 A | * | 7/1994 | Heibel et al. .............. | 60/547.1 |
| 5,454,224 A | * | 10/1995 | Castel et al. ............... | 60/547.1 |
| 5,984,429 A | * | 11/1999 | Nell et al. ................ | 303/113.4 |

FOREIGN PATENT DOCUMENTS

| | | |
|---|---|---|
| DE | 93 15 502 | 10/1993 |
| FR | 2659054 A1 * | 9/1991 |
| GB | 2235026 A * | 2/1991 |
| GB | 2235263 A * | 2/1991 |
| GB | 2259339 A * | 3/1993 |

* cited by examiner

*Primary Examiner*—Pam Rodriguez
(74) *Attorney, Agent, or Firm*—McGlew and Tuttle, P.C.

(57) ABSTRACT

A motor vehicle brake system actuator has a pedal block with a brake pedal fixed thereon pivotably. A brake power booster with a two-part housing and with a main brake cylinder assembly unit is connected to the brake pedal for the admission of hydraulic power into the individual wheel brakes of the motor vehicle. The pedal block and the brake power booster housing bottom part facing the pedal block are made in one piece from plastic.

9 Claims, 3 Drawing Sheets

ACTUATING DEVICE FOR THE BRAKING SYSTEM OF A MOTOR VEHICLE

FIELD OF THE INVENTION

The present invention pertains to an actuator for the brake system of a motor vehicle with a pedal block with a brake pedal fixed thereon pivotably, with a brake power booster with a two-part housing and with a main brake cylinder assembly unit connected to same for the admission of hydraulic power to the individual wheel brakes of the motor vehicle.

BACKGROUND OF THE INVENTION

Various designs of such an actuator have been known in the state of the art and are used, in principle, in all motor vehicles. The design of the individual components of the actuator differs here in terms of size and shape as well as additional attached parts, but there are also fundamental agreements in the individual components. Thus, the brake power booster housing is manufactured from steel sheet for reasons of strength and is flanged to the pedal block, which is usually also made of metal, during the assembly of the actuator. The main brake cylinder assembly unit, which comprises a main brake cylinder housing with inner components and a reservoir for the hydraulic brake fluid, is screwed to the front side of the brake power booster facing away from the pedal block. The main brake cylinder housing is, in general, a machined metal casting. Attached parts additionally necessary for the operation of the entire actuator, such as limit switches, actuating cables, restoring springs or mounting components, are mounted individually on the entire assembly unit.

Both the selection of the material and the design of the individual assembly units, such as the usually separate supply of parts by brake vendors and, e.g., manufacturers of the pedal mechanism, lead to great manufacturing and assembly efforts and, as a result, to high costs, and, moreover, the reduction of the depth of manufacture for individual motor vehicle assembly units, which is now often desired in the automobile industry, can also be achieved only with difficulty.

SUMMARY AND OBJECTS OF THE INVENTION

The technical object of the present invention is therefore to design an actuator for the brake system of a motor vehicle such that both the manufacturing costs and the installation dimensions can be reduced. In addition, an actuator of the type according to the present invention should make it possible to substantially reduce the depth of manufacture in order to meet the needs of the modern automobile manufacture in terms of modular design.

This object is accomplished according to the present invention by the pedal block and the brake power booster housing, which faces the pedal block, being made in one piece of plastic.

The combining of the brake power booster housing with the pedal block offers decisive advantages in several respects over the prior art. On the one hand, additionally necessary components and their mounts can be inexpensively integrated in the pedal block-brake power booster housing module in a very simple manner because of the plastic material to a much greater extent than in the sheet-metal design provided hitherto. On the whole, an extremely compact assembly unit is obtained, which can be additionally complemented by the entire brake power booster housing being designed as an injection-molded plastic part, wherein the connected main brake cylinder assembly unit is integrated with a reservoir and a piston unit in the entire injection-molded plastic part. Due to this design according to the present invention, an assembly unit is obtained which can be completely preassembled and leads to a reduction in the number of the individual parts, to lower costs and, because of the large amount of plastics used, to a substantial weight reduction. In addition, the entire assembly unit can be preassembled and tested independently from the vehicle, so that the entire actuator only needs to be fastened to the splashboard of the corresponding vehicle during the final assembly proper of the motor vehicle and the brake lines must be connected to the individual wheel brakes of the motor vehicle.

Other advantageous embodiments of the subject of the present invention appear, together with the technical teaching of the principal claim, from the features of the subclaims.

It proved to be advantageous, in particular, that a hydraulic tube for receiving the main brake cylinder pistons, which said tube is jacketed by the injection-molded plastic part, is arranged within the piston unit of the main brake cylinder assembly unit. This design embodiment ensures the reliable function of the main brake cylinder as well as a correspondingly long service life; on the other hand, the injection molding of the hydraulic tube into the injection-molded plastic part of the actuator according to the present invention means very inexpensive manufacture. Moreover, the design of the actuator according to the present invention can be made even more inexpensive if a common mounting element is provided on the pedal block for mounting both the brake pedal and an additional clutch and/or gas pedal. The individual mounts with their individual parts as well as the costs needed for the mounting of the individual pedals, which are customary in the prior art, are eliminated due to these measures.

In addition, it proved to be advantageous for the pedal block to have contactless sensors for picking up the signals of the angular position of the brake pedal and the additional clutch or gas pedal, where the signals are transmitted to downstream evaluating units of an electronic unit of the motor vehicle by a central plug-in assembly unit. The contactless (Hall) sensors operate without rebound and wear, can be set electronically and lead to a further integration of the functions of the entire actuator, and the final testing of the entire module is further simplified.

In addition, the feeling of actuation for the pivoting of the individual pedals is improved by the pedal block having one or more cams, on which a spring-loaded roller connected rigidly to the brake pedal and/or the clutch and gas pedals rolls during the pivoting of the pedals.

Moreover, the manufacture of the brake power booster housing from a plastic makes it possible to integrate supply lines for admitting vacuum or ambient pressure into the interior space of the brake power booster housing in the housing wall of the brake power booster housing. This measure leads, especially in the case of two-stage brake power boosters (tandem BPBs), to a further reduction in the assembly effort.

Two exemplary embodiments of the subject of the present invention will be explained in greater detail below on the basis of the drawings attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiments of the invention are illustrated.

DESCRIPTION OF THE PREFERRED EMBODIMENT

Figure 1:
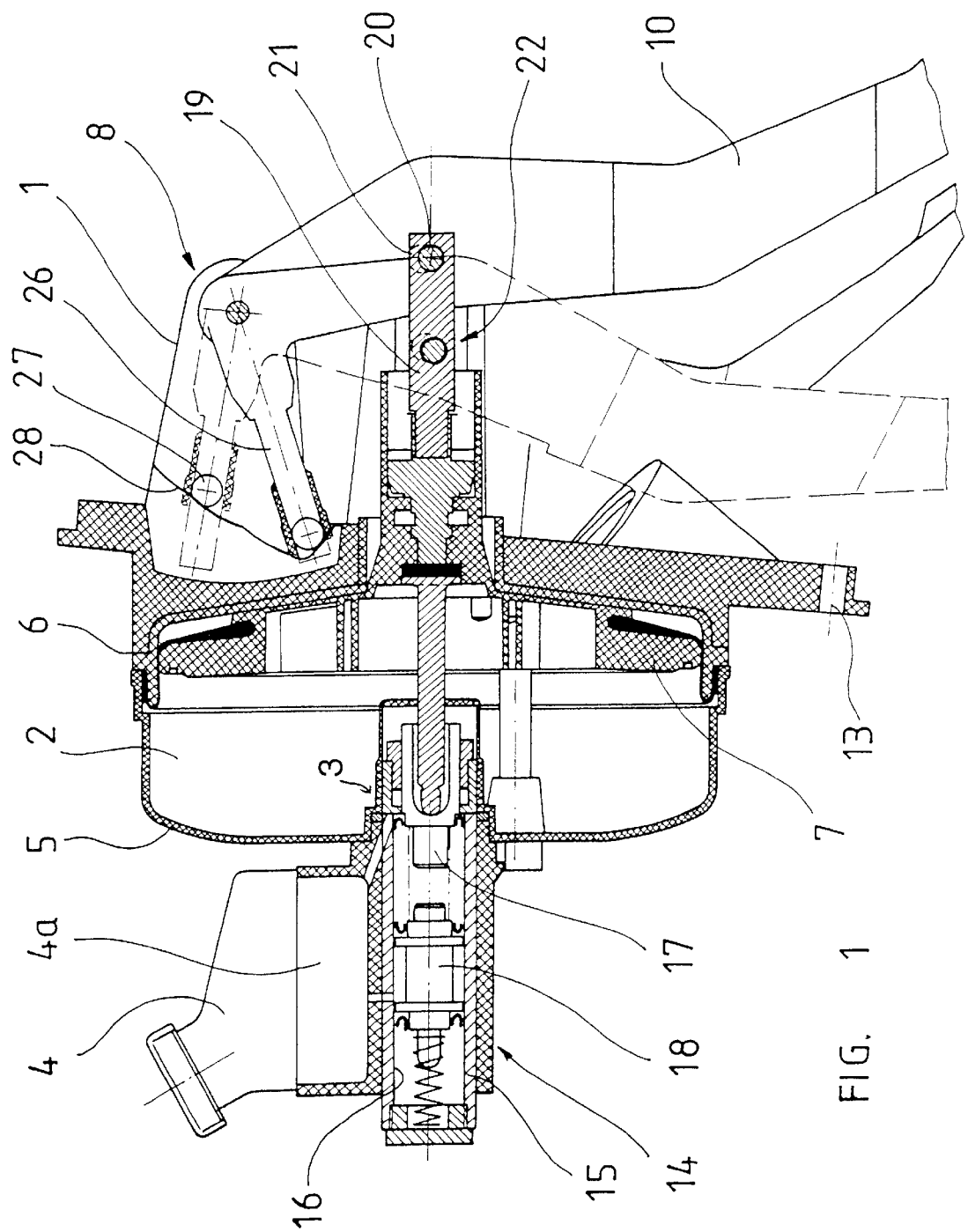
FIG. 1 is a sectional side view of a first exemplary embodiment of the actuator according to the present invention for the brake system of a motor vehicle.

Referring to the drawings in particular, the actuator for the brake system of a motor vehicle has a pedal block 1, a brake power booster 2 as well as main brake cylinder assembly unit 3 connected to a reservoir 4. A plurality of brake lines for the admission of hydraulic power into the individual wheel brakes, which are not shown specifically in the drawings for reasons of clarity, are connected to the main brake cylinder assembly unit.

The brake power booster 2 comprises essentially a housing bell 5 and a housing bottom part 6, which together define an interior space divided by a piston 7 into two partial areas in this exemplary embodiment.

A projecting bracket 8, which receives a common mounting element 9 for the pivotable mounting of a brake pedal 10 and of a clutch pedal 11, is arranged at the pedal block 1. The pedal block 1 itself can be fixed to a splashboard of a motor vehicle, which splashboard is not shown specifically, by means of a plurality of bolts that can be passed through through holes 13. The pedal block 1, the housing bottom part 6 and the housing bell 5 are injection-molded plastic parts, the pedal block 1 and the housing bottom part 6 forming a common assembly unit.

Due to this special design, the entire actuator has an extremely compact design, which leads to a reduction in the length of the entire module from the main brake cylinder assembly unit to the brake pedal by approx. 15% or, in absolute terms, by approx. 60 mm compared with the actuator known from the prior art. In addition to the design of the brake power booster housing 5, 6 and of the pedal block 1, the piston unit 14 belonging to the main brake cylinder assembly unit 3 is also designed as an injection-molded plastic part, where the injection-molded plastic part of the piston unit 14 also comprises the reservoir part 4a of the main brake cylinder assembly unit 3. A hydraulic tube 15, which accommodates the brake pistons 17, 18 for admitting hydraulic power into the individual wheel brakes in an inner through hole 16, is integrated into the injection-molded plastic part within the piston unit 14. The main brake cylinder assembly unit 3, the brake power booster 2 and the pivotable brake pedal 10 are connected by a plunger rod 19. The plunger rod 19 is connected to the brake pedal 10 by a bolt 20, which is displaceably accommodated in an elongated hole 21 of the brake pedal 10. This special connection between the plunger rod 19 and the brake pedal 10 makes possible the straight-line motion 22 of the plunger rod, which leads to a further reduction in the overall length of the actuator.

Figure 3:
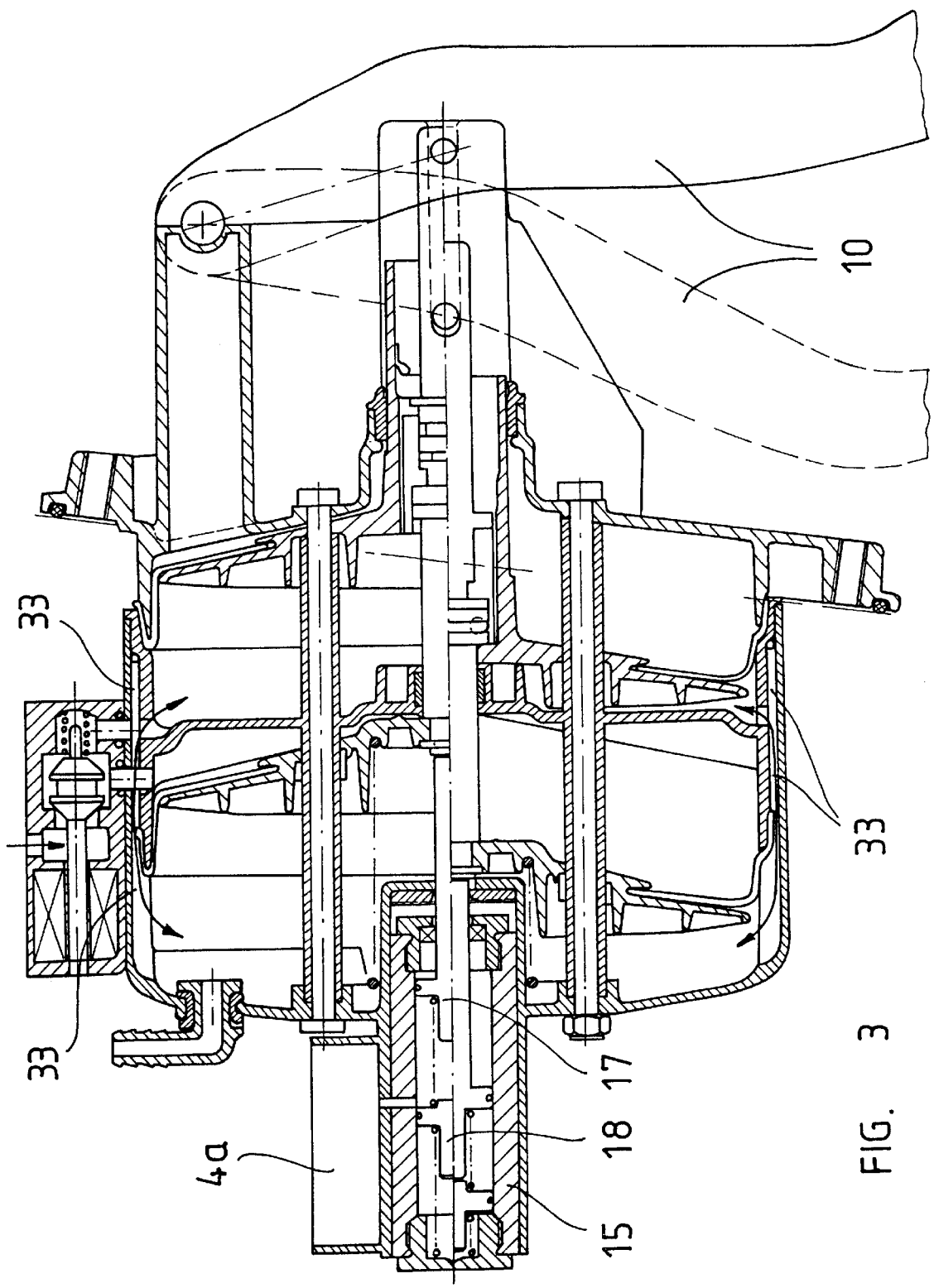
FIG. 3 is a sectional side view of a second exemplary embodiment of the subject of the present invention.

While the overall utilization of the space remains the same, the reduction in the overall length makes it possible to use a tandem brake power booster, as is shown in FIG. 3, instead of a prior-art one-stage variant, which in turn increases the assisting forces during the actuation of the brake pedal and facilitates the operation of the brake system for the user.

FIG. 1 also shows that a pin element 26 connected rigidly to the brake pedal 10 is made in one piece with the brake pedal 10 at the upper end of the brake pedal 10, adjacent to the mounting element. The pin element 26 is finger-shaped and has, at its front end facing away from the brake pedal 10, at least one roller 27, which is pressed by a compression spring not shown specifically, against a cam 28 at the pedal block 1. Pivoting of the brake pedal 10 leads to the rolling of the roller 27 on the cam 28 and, as a result, to a restoring moment varying depending on the angle of pivoting and, as a consequence, to a varying feeling of actuation for the brake pedal 10.

The design of the cam 28 in conjunction with the rolling effect of the roller 27 makes it possible to adapt the brake pedal actuation and to optimize the feeling of actuation.

Figure 2:
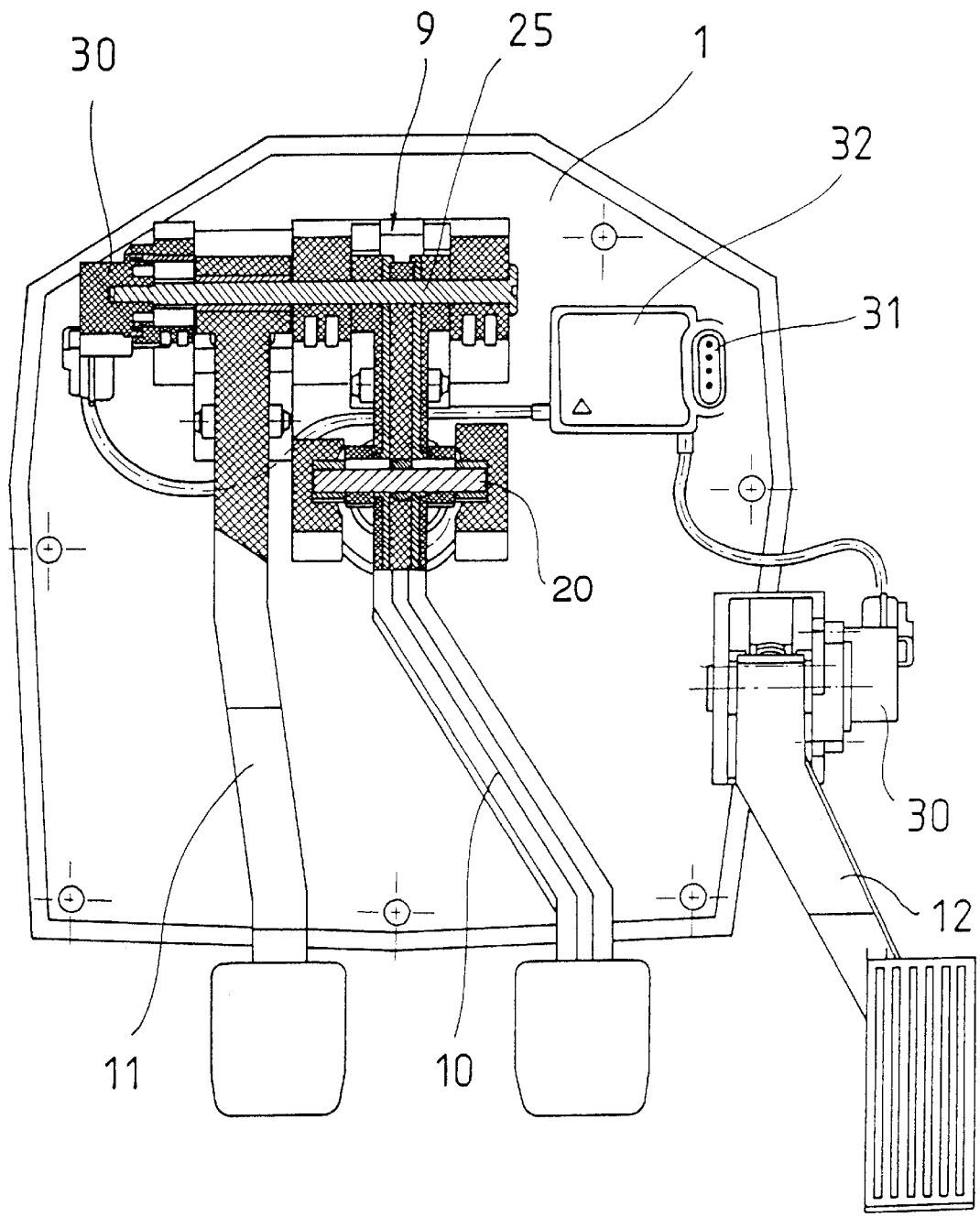
FIG. 2 is a top view of the actuator from FIG. 1 from the side facing the passenger compartment.

FIG. 2 shows that the clutch pedal 11 and the brake pedal 10 are arranged pivotably on a common mounting axis 25, which contributes to a reduction in the number of individual parts as well as in the effort needed for assembly compared with prior-art individual mounts.

Corresponding to another advantageous embodiment of the subject of the present invention, at least one Hall sensor or inductive sensor 30 is arranged at the pedal block 1 for the contactless signal pick-up of the signal of the angular position of the brake pedal. Such a sensor 30 may, of course, also be used for the contactless data transmission of the instantaneous position of a gas pedal 12, which is also illustrated in FIG. 2.

The signals received are transmitted by a central plug-in assembly unit 31, which transmits the signals to the electronic unit of the motor vehicle via an evaluating unit 32. The evaluating unit 32 may be integrated according to the present invention in the pedal block (see FIG. 2) and the signals received can be converted by means of a CAN BUS or a corresponding processor for further use within the electronic unit of the motor vehicle.

The Hall sensors or inductive sensors 30 used are designed according to the present invention such that they replace the switches customarily used in the prior art for taillights, shift lock, and possibly present brake assist and similar complementary sensor elements.

Moreover, the fact that the brake power booster housing is made of plastic makes it possible to integrate supply lines 33 for admitting vacuum or ambient pressure into the interior space of the brake power booster housing in the housing wall of the brake power booster housing. FIG. 3 shows an embodiment variant according to the present invention with a two-stage brake power booster (tandem BPB), in which the supply lines are embedded in the housing. This measure leads, especially in the case of two-stage brake power boosters, to a further reduction in the effort needed for assembly.

Thus, the drawings attached show clearly that the design according to the present invention leads to a compact actuator for the brake system of a motor vehicle, in which the number of individual parts used is substantially reduced compared with the prior art and which makes possible the preassembly of the entire assembly unit including the final testing. The entire actuator can be supplied completely to the assembly line on which the final assembly of the motor vehicle is carried out and is fastened to the body of the motor vehicle only by means of the bolts passed through the holes 13. In addition, only connection of the brake lines to the main brake cylinder assembly unit 3 as well as the plugging in of the plug-in assembly unit 31 to a corresponding mount on the body are necessary.

The compact design makes it possible to use a tandem brake power booster wherever no space was available for such a two-stage brake power booster before because of the limited space available for installation in the engine compartment.

While specific embodiments of the invention have been shown and described in detail to illustrate the application of the principles of the invention, it will be understood that the invention may be embodied otherwise without departing from such principles.

What is claimed is:

1. A motor vehicle brake system actuator, comprising:
   a pedal block;
   a brake pedal pivotably fixed to said pedal block;
   a brake power booster with a two-part housing including a housing bottom part, said brake power booster housing being an injection-molded plastic part;
   a main brake cylinder assembly unit connected to said brake pedal, said main brake cylinder adapted to be used for the admission of hydraulic power into individual wheel brakes of the motor vehicle, said pedal block and said brake power booster housing bottom part facing said pedal block are made in one piece from plastic, said main brake cylinder assembly unit having a reservoir with a reservoir bottom and a piston unit integrated within said injection-molded plastic part; and
   a hydraulic tube jacketed by said injection-molded plastic part, said hydraulic tube for receiving individual brake pistons within said piston unit.

2. An actuator in accordance with claim 1, wherein said pedal block has a common mounting element for mounting said brake pedal and an additional clutch pedal.

3. An actuator in accordance with claim 1, further comprising:
   a central plug-in assembly unit
   an evaluating unit adapted to be used by an electronic unit of the motor vehicle; and
   contactless sensors associated with said pedal block, said contactless sensors forming signals indicative of the angular position of said brake pedal and of an additional gas pedal, wherein the signals are transmitted downstream to said evaluating unit and to said central plug-in assembly unit.

4. An actuator in accordance with claim 3, wherein said contactless sensors are Hall sensors.

5. An actuator in accordance with claim 3, wherein said evaluating unit has a CAN BUS for data conversion and is integrated within said pedal block.

6. An actuator in accordance with claim 1, further comprising:
   a spring-loaded roller rigidly connected to said brake pedal wherein said pedal block has at least one cam, on which said spring-loaded roller rolls during the pivoting of said brake pedal.

7. An actuator in accordance with claim 1, further comprising:
   a common plunger rod;
   a straight-line motion element, said brake pedal having an elongated hole, wherein said brake power booster and said main brake cylinder assembly unit can be actuated by said common plunger rod, wherein said common plunger rod is mounted in said pedal block by said straight-line motion element and is accommodated displaceably in said elongated hole at the said brake pedal.

8. An actuator in accordance with claim 1, further comprising: supply lines for admitting vacuum or ambient pressure into the interior space of said brake power booster housing, said supply lines being integrated in a housing wall of said brake power booster housing made of plastic.

9. A motor vehicle brake system actuator, comprising:
   a pedal block;
   a brake pedal pivotably fixed to said pedal block;
   a brake power booster with a two-part housing including a housing bottom part, said brake power booster housing being an injection-molded plastic part;
   a main brake cylinder assembly unit connected to said brake pedal, said main brake cylinder adapted to be used for the admission of hydraulic power into individual wheel brakes of the motor vehicle, said pedal block and said brake power booster housing bottom part facing said pedal block are made in one piece from plastic, said main brake cylinder assembly unit having a reservoir with a reservoir bottom and a piston unit integrated within said injection-molded plastic part;
   a central plug-in assembly unit
   an evaluating unit adapted to be used by an electronic unit of the motor vehicle, said evaluating unit has a CAN BUS for data conversion and is integrated within said pedal block; and
   contactless sensors associated with said pedal block, said contactless sensors forming signals indicative of the angular position of said brake pedal and of an additional gas pedal, wherein the signals are transmitted downstream to said evaluating unit and to said central plu-gin assembly unit.

* * * * *